Dec. 11, 1962 R. L. ELLIOTT ETAL 3,068,028
CONDUIT AND METHOD FOR MAKING SAME
Filed Sept. 28, 1956

INVENTORS
RICHARD L. ELLIOTT
CARL R. JOSLYN
BY

*Bauer and Seymour*
ATTORNEYS

United States Patent Office 3,068,028
Patented Dec. 11, 1962

3,068,028
CONDUIT AND METHOD FOR MAKING SAME
Richard L. Elliott and Carl R. Joslyn, Sidney, N.Y., assignors to The Bendix Corporation, a corporation of Delaware
Filed Sept. 28, 1956, Ser. No. 612,798
9 Claims. (Cl. 285—149)

This invention relates to flexible conduits or hose, such as those adapted for use in protecting and radio shielding an electrical conductor or the like, and to methods for making the same.

An object of the present invention is to provide a novel and improved radio shielding conduit which is very flexible and yet non-porous.

Another object of the invention is to provide a novel flexible conduit wherein parts are novelly combined with non-metallic material to produce a moisture-proof structure.

A further object is to provide a conduit of the above character which has an impervious electrically insulating outer sheath.

A further object is to provide a conduit of the above character which is not seriously affected by electrical corona or by exposure to oils, greases and gasoline.

Another object is to provide a novel method of fabricating conduits possessing the above advantages.

Yet another object is to provide a novel method of making flexible metallic tubing having the walls thereof impregnated with a solid, flexible compound whereby the manufacture of such tubing is simplified, and the cost thereof is substantially reduced.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a side elevation view showing one type of conduit made in accordance with and embodying the present invention;

Figure 1:
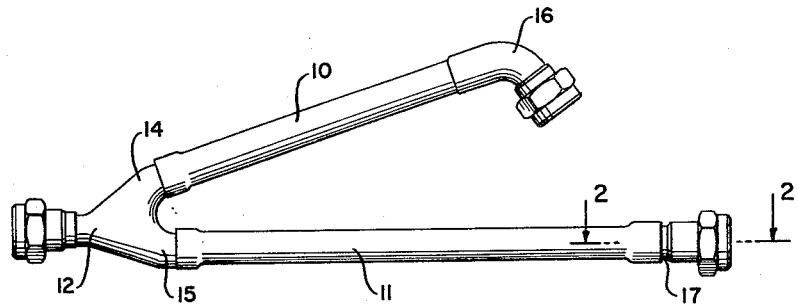
Figure 3:
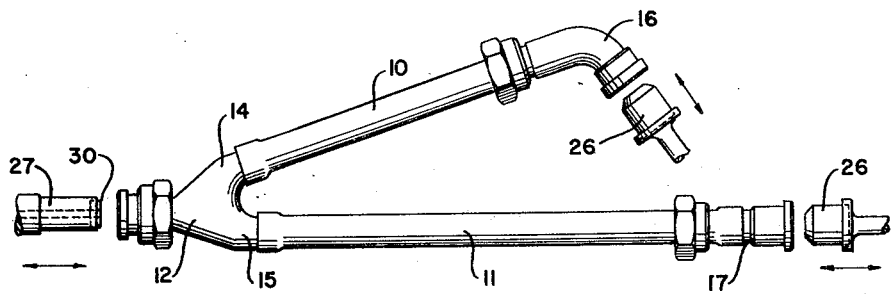
FIG. 3 is a schematic view in elevation of the conduit of FIG. 1 about to undergo an impregnating treatment in accordance with the invention.
Figure 2:
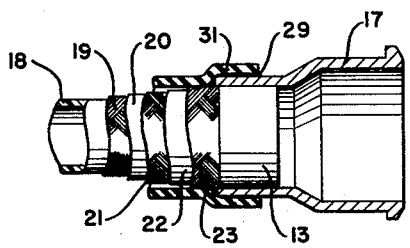
FIG. 2 is an enlarged detail view, partly in section and with parts broken away, illustrating the internal construction of said conduit, the section being taken generally along line 2—2 of FIG. 1.

The single embodiment of the invention chosen for illustration in the drawings is in the form of a Y-shaped flexible shielding conduit having a main portion 12 and branch portions 10 and 11. Rigid tubular ferrules or fittings are secured to the ends of the main and branch portions of the conduit, the fitting on branch 11 being shown, by way of example, as straight, and that on branch 10 as curved. This novel conduit is suited to many purposes, and particularly to the shielding of electrical wires of engine ignition systems e.g., internal combustion engines for airplanes. In this latter use, the conduit is subjected to exremely adverse conditions, including vibration by wind currents and engine operation, exposure to extremes of high and low temperatures, electrical corona, grease, oil, gasoline, and moisture, wide variations in altitude, and rough handling by personnel.

The novel conduit construction shown comprises a plurality of superposed telescoped tubes or sleeves made of braided wire, three being shown in the illustrative embodiment, the innermost of which is designated 19, the intermediate wire tube being designated 21, and the outermost wire tube being designated 23. The wire strands forming such tubes may be braided in a known manner to make up the tubes, and may be constituted in various forms known to the art. In a preferred embodiment each strand is made up of about eight small wires laid side by side to simulate a flat strip. The tubes may be braided separately and inserted into one another, or the large diametered tubes may be braided directly on the smaller one as a core. The smallest or inner tube is generally braided on a solid removable core, which, of course, has been removed from the illustrated conduit.

Figure 4:
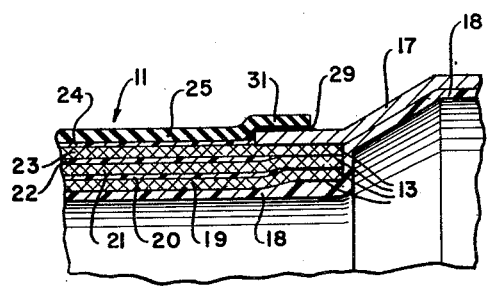
FIG. 4 is a fragmentary view in section, taken along a radial plane through a branch of the conduit and a portion of its terminal fitting, of the conduit after it has been treated in accordance with the present invention.

The ends of the branches of the multiple layer conduit have the end portions of wire tubes 19, 21, and 23 thereof firmly secured together by means of solder, indicated at 13, and each said end is secured by means, such as solder also designated 13, within the sleeve or ferrule-like terminal fitting. This construction is shown in FIG. 4 in connection with branch portion 11 of the conduit and fitting 17 thereon.

The conduit of the invention has the branches thereof covered by a flexible imperforate tube 25, which in the form shown is in the form of a preformed rubber or rubber-like tube which is telescoped over the outermost wire tube 23 of the conduit. Where oil and grease-resistance are desired, the tube 25 may be made, for example, of a synthetic rubber such as "neoprene." One manner of forming the tube involves the telescoping of the required length of the outer tube 25 over one end of the telescoped wire tubes 19, 21, and 23 prior to attachment of the terminal fitting to the telescoped wire tubes at such end. The end of the tube 25 normally overlying such end of the composite wire tube may be rolled back on itself away from such end of the composite wire tube when the terminal fitting is applied to such end and the fitting heated to solder it to the wire tubes.

For the purpose of rendering the conduit moisture proof, and at the same time to provide a smooth, non-chafing inner surface on the conduit to protect insulated wire passing therethrough against damage, the above described conduit made up of superposed wire tubes 19, 21, and 23 and the outer flexible impervious tube 25, is treated in a novel manner now to be described to provide therein a lining 18 and at the same time to provide thin layers 20, 22, and 24 respectively, of the lining material between adjacent layers of braided metal tubing and between the outermost layer of metal tubing and tube 25.

The layers 20, 22, and 24 are integrally connected to each other and to lining 18 through the porous braiding of the intervening braided metal tubes. In addition to its non-chafing properties, the material of which lining 18 and layers 20, 22, and 24 is made should have good resistance to corona and should not contain volatiles for some uses. The lining material should be non-porous, flexible and resilient. When set, said material should retain these properties when subjected to a wide range of temperatures and exposed to grease, gasoline and moisture. A suitable material should also be tough and have the ability to conform to the braided metal tubing and withstand continual bending stresses. Elastomers, such as those having a polyvinylchloride base and silicone rubbers have been found suitable.

One lining material which has been found suitable for use in flexible conduits for radio shielding aircraft engine ignition systems, for example, is a synthetic plastic material known in the trade as a plastisol, i.e., a fluid dispersion of polyvinylchloride polymer in a plasticizer which may be converted by heat alone to an elastomeric vinyl compound. This material has a polyvinylchloride base with suitable plasticizers and a heat stabilizer. Suitable fillers may be used, if necessary, to vary the flow characteristics. A suitable composition consists of ten parts by weight of polyvinylchloride, such as "Geon #121," four parts of Rohm and Haas "Paraplex G–50," two parts of "Paraplex G–60," (a polyester) and two parts of a heat stabilizer consisting of a mixture of Paraplex G–50 and dibasic lead phthalate in equal parts. This material is prepared for application at normal room temperature. The Geon #121 should be in the form of a fine powder, the plasticizers (Paraplex) are added in liquid form, and the heat stabilizing mixture is added in finely powdered, well-mixed form. The ingredients are then mixed thoroughly, preferably under vacuum. The thus mixed ingredients are then applied to the above described structure composed of the superposed telescoped braided wire tubes 19, 21, and 23, the overlying flexible impervious tube 25, and the terminal fittings 12, 16, and 17 secured to the composite wire tube structure as above described, in accordance with the novel method of the invention, one embodiment of which will now be described.

It will be assumed that the above described conduit assembly is thoroughly clean and dry. The ends of tube 25 overlying the sleeves of the fittings 12, 16, and 17 are cemented to such sleeves as by a layer of cement 29 (FIG. 4). The ends of the outer flexible tube 25 are thus sealed to the outermost braided wire tube 23 of the conduit through the medium of the sleeves of the respective fittings to which the ends of such tube 23 are soldered. The conduit is connected to a source of impregnating compound above described through a supply pipe, or fixture, 27. The latter may fit into the end of ferrule 12, for example, and is preferably provided with a gasket 30 which engages, and is pressed firmly against, the outer end of fitting 12 to provide a seal. The impregnating compound hereinafter sometimes referred to as "plastisol," is injected under pressure through pipe or fitting 27 into the end of ferrule 12 of the conduit in the form of a heavy, viscous, yet flowable material, a pressure of about 85 to 95 pounds per square inch being satisfactory. The compound is injected into the conduit until the latter is filled, as evidenced by the flow of compound out of the ends of the sleeves or ferrules of fittings 16 and 17.

The ends of the conduit, at the outer end of each of terminal fittings 16 and 17, are now sealed by plugs 26 which are applied to the outer ends of fittings 16 and 17 and seated thereinto by applying axial pressure to the plugs, after which additional plastisol is introduced under pressure through fixture 27. The tube 25 has sufficient resistance to radial expansion under internal pressure to insure that it does not expand or dilate unduly when subjected to sufficient pressure for the plastisol completely to impregnate the porous walls of the braided metal tubes forming the body of each conduit branch, thereby forming non-porous wall structures. Upon release of the pressure on the plastisol introduced through fitting 27, outer tube 25 tends to return to its normal diameter, thereby forcing or flushing out excess plastisol between it and the outer braided tube 23. The resulting impregnated wall structure is completely free of air bubbles, voids, and the like.

After the conduit has been thus completely filled with impregnating compound, the flow of compound through fitting 27 is stopped, and fittings 26 and 27 are removed from the conduit. The conduit assembly is removed from the holding fixture, and is hung with its branches in a generally vertical position, to allow excess compound to drain out. Preferably the conduit is hung over a sump to collect the thus drained excess compound, since such compound may be reused. A drainage time of from 30 to 60 minutes is usually satisfactory. The assembly is now transferred to a suitable oven and baked for a suitable time and at a suitable temperature to set or cure the impregnating compound. Ordinarily a temperature of 340–360° F. and a baking time of 25–30 minutes are satisfactory. The baked assembly is removed from the oven and allowed to cool to room temperature, after which it is cleaned to remove excess plastisol therefrom as required.

The present invention provides an improved moisture-proof radio shielding conduit, and an improved simplified, reliable and effective method for fabricating such conduit. The novel method makes it possible to make such conduits with assurance as to the high quality of the finished product and to effect such fabrication rapidly and at low cost with a minimum waste of materials. The method dispenses with the necessity of providing any separate confining structure for the conduit to prevent the widespread lateral escape of impregnating compound from the side walls of the conduit, and thus avoids the need for cleaning the compound from any such confining structure between successive uses thereof. Further, the method provides for the ready escape of air from the interior of the conduit and its porous side walls, thereby allowing the ready attainment of fully impregnated, void free conduit walls. The outer tube 25, which is preferably performed as above disclosed, forms a desirable smooth electrically insulating outer surface layer on the conduit.

Although only a single embodiment of the invention has been illustrated in the accompanying drawings and described in the foregoing specification, it is to be expressly understood that the invention is not limited thereto. For example, the conduit may have an infinite variety of shapes, including those having only one straight length of conduit as well as those having a plurality of branches connected by appropriate fittings. The method is also obviously applicable to the production of an infinite variety of conduits, including those above mentioned. Various other changes may also be made, such as in the specific materials, temperatures and the like suggested herein by way of example and in the design and arrangement of the parts illustrated without departing from the spirit and scope of the invention as the same will now be understood by those skilled in the art.

What is claimed is:

1. A flexible conduit comprising a plurality of braided wire tubes telescoped to form a multi-ply metallic hose, a pre-formed imperforate flexible outer tube made of elastic plastic material telescoped over the outer braided wire tube, and a unitary mass of solid flexible material lining said hose and filling the voids in and between the walls of said tubes, each of the ends of the metallic hose being telescoped within and connected to a ferrule and the ends of said flexible outer tube overlying and being sealed to the ferrules.

2. A flexible conduit as defined in claim 1 wherein the hose consists of at least three braided tubes.

3. A flexible conduit as defined in claim 1 wherein said mass consists of a rubber-like material.

4. The method of making a flexible conduit which comprises telescoping a plurality of braided wire tubes to form a multi-ply porous walled metallic hose, telescoping a preformed solid imperforate outer flexible tube over the outermost wire tube, said outer flexible tube being adapted to form a permanent cover which is a part of the finished conduit and while said outer flexible tube remains telescoped over the braided wire tubes filling the conduit and the voids in the walls of the conduit with a sluggish fluid curable compound, suspending the conduit so as to allow drainage of excess compound from the central passage in the conduit, and baking the thus treated conduit to cure the compound retained therein.

5. The method defined in claim 4 including sealing the ends of the outer tube to the outer surface of the outermost braided wire tube of the conduit.

6. The method of claim 4 wherein the compound is introduced axially of the innermost braided wire tube.

7. The method defined in claim 5 wherein the ends of the outer tube are sealed to the outer surface of the conduit before the introduction of the compound into the outermost braided wire tube of the conduit.

8. The method of making a flexible conduit which comprises telescoping a plurality of braided wire tubes to form a multi-ply porous walled metallic hose, telescoping a solid preformed imperforate elastic plastic flexible tube over the outermost wire tube, said elastic plastic tube being adapted to form a permanent cover which is a part of the finished conduit and while said outer flexible tube remains telescoped over the braided wire tubes filling the conduit and the voids in the walls of the conduit with a sluggish fluid curable compound under pressure, draining excess compound from the central passage in the conduit, and baking the thus treated conduit to cure the compound retained therein.

9. The method as claimed in claim 8 comprising the following steps in the order named: introducing the compound into the conduit so as to fill the conduit with the interior of the conduit in communication with the atmosphere, closing off the interior of the conduit from the atmosphere, and introducing additional compound into the closed conduit under pressure sufficient appreciably to expand the elastic tube.

References Cited in the file of this patent

UNITED STATES PATENTS

| | | |
|---|---|---|
| 1,816,740 | Ogren | July 28, 1931 |
| 2,156,899 | Pierce | May 2, 1939 |
| 2,305,644 | Stone | Dec. 22, 1942 |
| 2,487,554 | Hurst | Nov. 8, 1949 |
| 2,577,049 | Uline | Dec. 4, 1951 |
| 2,621,703 | Morrison | Dec. 16, 1952 |
| 2,623,145 | Upton | Dec. 23, 1952 |
| 2,652,093 | Burton | Sept. 15, 1953 |
| 2,690,769 | Brown | Oct. 5, 1954 |
| 2,698,353 | Carr et al. | Dec. 28, 1954 |
| 2,700,988 | Smisko | Feb. 1, 1955 |
| 2,731,279 | Main | Jan. 17, 1956 |
| 2,757,690 | Young | Aug. 7, 1956 |
| 2,759,864 | Kuebler | Aug. 21, 1956 |
| 2,781,785 | Davies | Feb. 19, 1957 |